United States Patent
Shimada

(10) Patent No.: US 10,168,694 B2
(45) Date of Patent: Jan. 1, 2019

(54) HEAT SOURCE DEVICE

(71) Applicant: RINNAI CORPORATION, Nagoya-shi, Aichi (JP)

(72) Inventor: Shigeki Shimada, Aichi (JP)

(73) Assignee: RINNAI CORPORATION, Nagoya-Shi (JP)

( * ) Notice: Subject to any disclaimer, the term of this patent is extended or adjusted under 35 U.S.C. 154(b) by 0 days.

(21) Appl. No.: 15/726,646

(22) Filed: Oct. 6, 2017

(65) Prior Publication Data

US 2018/0120824 A1 May 3, 2018

(30) Foreign Application Priority Data

Nov. 1, 2016 (JP) ................. 2016-214630

(51) Int. Cl.
| | | |
|---|---|---|
| *G05B 23/02* | (2006.01) | |
| *G05D 23/19* | (2006.01) | |
| *G05D 23/275* | (2006.01) | |
| *F24D 19/10* | (2006.01) | |
| *F24D 3/08* | (2006.01) | |
| *G05B 15/02* | (2006.01) | |

(52) U.S. Cl.
CPC .......... *G05B 23/027* (2013.01); *F24D 3/087* (2013.01); *F24D 19/1066* (2013.01); *G05D 23/1904* (2013.01); *G05D 23/1919* (2013.01); *G05D 23/2754* (2013.01); *F24D 2220/0235* (2013.01); *G05B 15/02* (2013.01)

(58) Field of Classification Search
CPC .......................... A47K 2005/1218; B08B 3/02
USPC ......................................................... 340/506
See application file for complete search history.

(56) References Cited

U.S. PATENT DOCUMENTS

| | | | | |
|---|---|---|---|---|
| 5,287,570 A | * | 2/1994 | Peterson ................. | E03C 1/052 4/625 |
| 2007/0204925 A1 | * | 9/2007 | Bolderheij ............... | E03C 1/04 137/801 |
| 2012/0160472 A1 | * | 6/2012 | Kim ........................ | F24D 12/02 165/287 |
| 2017/0259788 A1 | * | 9/2017 | Villa-Real .............. | B60S 1/488 |

FOREIGN PATENT DOCUMENTS

| | | |
|---|---|---|
| JP | H05-256511 | 10/1993 |
| JP | 2003-021344 | 1/2003 |
| JP | 2013-221686 | 10/2013 |

* cited by examiner

*Primary Examiner* — Fabricio R Murillo Garcia
(74) *Attorney, Agent, or Firm* — Rankin, Hill & Clark LLP

(57) ABSTRACT

Provided is a heat source device including a control unit which, in response to a predetermined request for heating, sets a switching valve to a first circulation mode to communicate first and third ports, whereas to cut off communication between second and third ports, and performs a heating operation by actuating a burner and a circulation pump. In response to a predetermined request for hot water supply, the control unit sets the switching valve to a second circulation mode to communicate second and third ports, whereas to cut off communication between first and third ports, and performs a hot water supply operation, by actuating the burner and the circulation pump. A hot water supply stop alarm unit issues a hot water supply stop alarm that urges a user to stop using hot water when the request for heating is continued for a first predetermined time or more.

5 Claims, 3 Drawing Sheets

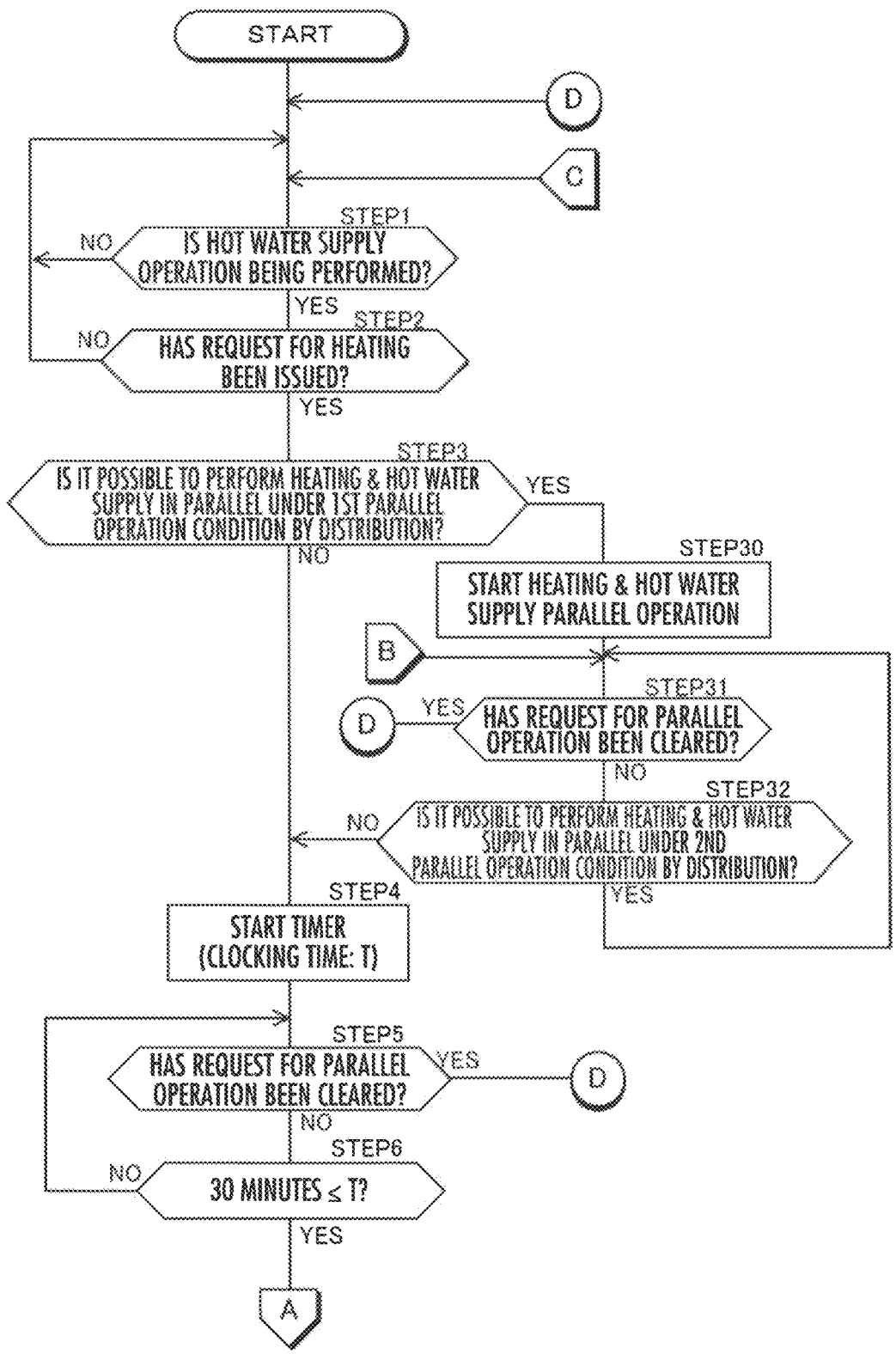

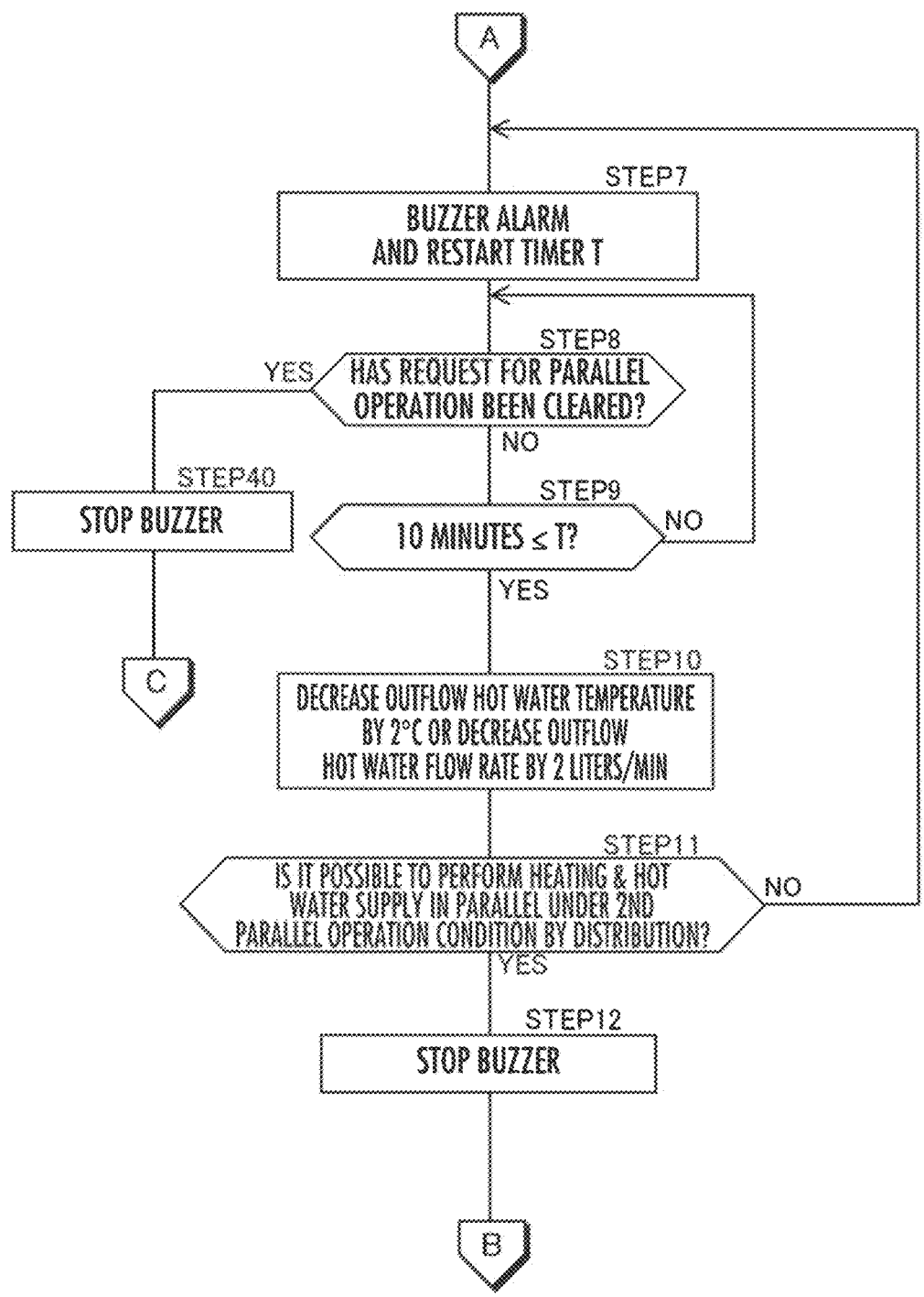

HEAT SOURCE DEVICE

BACKGROUND OF THE INVENTION

Field of the Invention

The present invention relates to a heat source device adapted to supply a heat medium to a heating terminal and to supply hot water.

Description of the Related Art

There have been known water heating apparatuses configured to notify a user if an apparatus failure or a situation to be improved takes place (refer to, for example, Patent Documents 1 to 3).

In the water heating apparatus described in Patent Document 1, the output of a buzzer sound is started when an operation for starting the supply of hot water is performed, and the output of the buzzer sound is stopped when the entry of water into the water heating apparatus and the ignition of a burner are detected. If the entry of water or the ignition of the burner is not detected due to a failure of the apparatus, then an alarm is continued to notify a user of the apparatus failure.

Further, in the water heating apparatuses described in Patent Documents 2 and 3, when the supply of hot water of a predetermined flow rate or more is continued for a predetermined time or more, an alarm is performed to urge a user to reduce the amount of hot water used.

Patent Document 1: Japanese Patent Application Laid-Open No. H05-256511

Patent Document 2: Japanese Patent Application Laid-Open No. 2013-221686

Patent Document 3: Japanese Patent Application Laid-Open No. 2003-21344

As will be discussed later, there has been known a heat source device which uses a single heating unit to perform both hot water supply and heating. This type of heat source device is required to achieve a good balance between the hot water supply and the heating.

SUMMARY OF THE INVENTION

The present invention has been made in view of the background described above, and it is an object of the invention to provide a heat source device which performs an alarm to achieve hot water supply and heating in a balanced manner by using a single heating unit.

A first mode of a heat source device in accordance with the present invention includes:

a heat medium circulation passage which has a heating terminal connected on a way thereof and through which a heat medium circulates;

a heat medium heating unit which is provided on a way of the heat medium circulation passage and which heats a heat medium that circulates in the heat medium circulation passage;

a hot water supply bypass passage which bypasses the heat medium heating unit and which is in communication with the heat medium circulation passage;

a hot water supply passage which has an upstream end thereof connected to waterworks and a downstream end thereof connected to a hot water supply tap;

a hot water supply heat exchanger which is connected on a way of the hot water supply bypass passage and the hot water supply passage and which heats water flowing through the hot water supply passage by heat exchange between a heat medium flowing through the hot water supply bypass passage and water flowing through the hot water supply passage;

a circulation mode switching unit which switches between a first circulation mode and a second circulation mode, the first circulation mode being a mode in which the circulation of the heat medium in the heat medium circulation passage that has passed through the hot water supply bypass passage and the heat medium heating unit is disabled, whereas the circulation of the heat medium in the heat medium circulation passage that has passed through the heat medium heating unit and the heating terminal is enabled, and the second circulation mode being a mode in which the circulation of the heat medium in the heat medium circulation passage that has passed through the heating terminal and the heat medium heating unit is disabled, whereas the circulation of the heat medium in the heat medium circulation passage that has passed through the hot water supply bypass passage and the heat medium heating unit is enabled;

a control unit which sets the first circulation mode by the circulation mode switching unit and performs a heating operation, in which the heat medium heating unit s actuated, in response to a predetermined request for heating, and which sets the second circulation mode by the circulation mode switching unit and performs a hot water supply operation, in which the heat medium heating unit is actuated, in response to a predetermined request for hot water supply; and a hot water supply stop alarm unit which performs a hot water supply stop alarm to urge a user of hot water to stop using the hot water in a case where the request for heating is continued for a first predetermined time or more while the hot water supply operation is being performed (a first aspect of the invention).

According to the present invention, if the request for heating is continued for the first predetermined time or more while the hot water supply operation is being performed, then it is assumed that there is, for example, a situation in which a first user is continuing to use hot water in a bath or the like, so that the heating operation is disabled, thus causing a decrease in the temperature in a room where a second user is present and where a heating terminal is installed. Further, if the situation is not changed, the temperature in the room may further decrease, causing the second user feel uncomfortable due to chilliness.

Therefore, the hot water supply stop alarm unit performs an alarm that urges the user of hot water to stop using the hot water if the request for heating is continued for the first predetermined time or more. This urges the first user (the user of the hot water) to stop using the hot water so as to enable the heating operation by ending the hot water supply operation, thus making it possible to restore the temperature in the room, in which the heating terminal is installed, by performing the hot water supply operation and the heating operation in a balanced manner.

Next, a second mode of the heat source device in accordance with the present invention includes:

a heat medium circulation passage which has a heating terminal connected on a way thereof and through which a heat medium circulates;

a heat medium heating unit which is provided on a way of the heat medium circulation passage and which heats the heat medium that circulates in the heat medium circulation passage;

a hot water supply bypass passage which bypasses the heat medium heating unit and which is in communication with the heat medium circulation passage;

a hot water supply passage which has an upstream end thereof connected to waterworks and a downstream end thereof connected to a hot water supply tap;

a hot water supply heat exchanger which is connected on a way of the hot water supply bypass passage and the hot water supply passage and which heats water flowing through the hot water supply passage by heat exchange between the heat medium flowing through the hot water supply bypass passage and water flowing through the hot water supply passage;

a circulation mode switching unit which changes a distribution ratio between a circulation flow rate of the heat medium in the heat medium circulation passage that has passed through the hot water supply bypass passage and the heat medium heating unit and a circulation flow rate of the heat medium in the heat medium circulation passage that has passed through the heating terminal and the heat medium heating unit;

a control unit which performs a parallel heating and hot water supply operation, in which the heat medium heating unit is actuated in a mode in which the heat medium is flown through both the hot water supply bypass passage and the heating terminal from the heat medium heating unit, the mode being set by the circulation mode switching unit, in a case where a predetermined request for heating and a predetermined request for hot water supply are both made and a first parallel operation condition is satisfied and a hot water supply stop alarm unit which performs a hot water supply stop alarm to urge a user of hot water to stop using the hot water in a case where a second parallel operation condition is no longer satisfied and a state in which the second parallel operation condition is not satisfied continues for a second predetermined time while the parallel heating and hot water supply operation is being performed (a second aspect of the invention).

In the present invention, if the second parallel operation condition is no longer satisfied while the parallel heating and hot water supply operation is being performed, then it is assumed that, for example, the use of hot water by a first user in a bath or the like has led to a decrease in the amount of heat radiation from a heating terminal installed in a room where a second user is present, and therefore the temperature in the room has decreased. If the situation is not changed, the temperature in the room may further decrease, causing the second user to feel uncomfortable due to chilliness.

Therefore, the hot water supply stop alarm unit performs an alarm that urges the user of the hot water to stop using the hot water if the state in which the parallel operation condition is not satisfied continues for the second predetermined time or more. This urges the first user (the user of the hot water) to stop using the hot water so as to enable switching to the heating operation alone by ending the hot water supply operation, thus making it possible to restore the temperature in the room, in which the heating terminal is installed, by performing the hot water supply operation and the heating operation in a balanced manner.

Further, in the heat source device according to the second aspect of the invention, the control unit controls heating power of the heat medium heating unit such that hot water of a desired hot water temperature will be supplied through the hot water supply passage in the parallel heating and hot water supply operation, and the hot water supply stop alarm unit performs, as the hot water supply stop alarm, processing for decreasing the desired hot water temperature (a third aspect of the invention).

This arrangement makes it possible to urge the user of the hot water to stop using the hot water by causing the user to feel a decrease in the hot water temperature.

Further, the heat source device according to the first aspect or the second aspect of the invention further includes: a flow rate changing unit that changes a flow rate of water that flows through the hot water supply passage, wherein the hot water supply stop alarm unit performs, as the hot water supply stop alarm, processing for decreasing a flow rate of water flowing through the hot water supply passage by the flow rate changing unit.

This arrangement makes it possible to urge the user of the hot water to stop using the hot water by causing the user to feel a decrease in the hot water flow rate.

Further, the heat source device according to the third aspect of the invention may include: a flow rate changing unit that changes the flow rate of water flowing in the hot water supply passage;

wherein the hot water supply stop alarm unit may perform, as the hot water supply stop alarm, processing for decreasing a flow rate of water flowing through the hot water supply passage by the flow rate changing unit.

BRIEF DESCRIPTION OF THE DRAWINGS

FIG. 2 is a first flowchart illustrating the processing performed when a request for heating is received while a hot water supply operation is being performed;
and
FIG. 3 is a second flowchart, illustrating the processing performed when the request for heating is received while the hot water supply operation is being performed.

DESCRIPTION OF THE PREFERRED EMBODIMENTS

Figure 1:
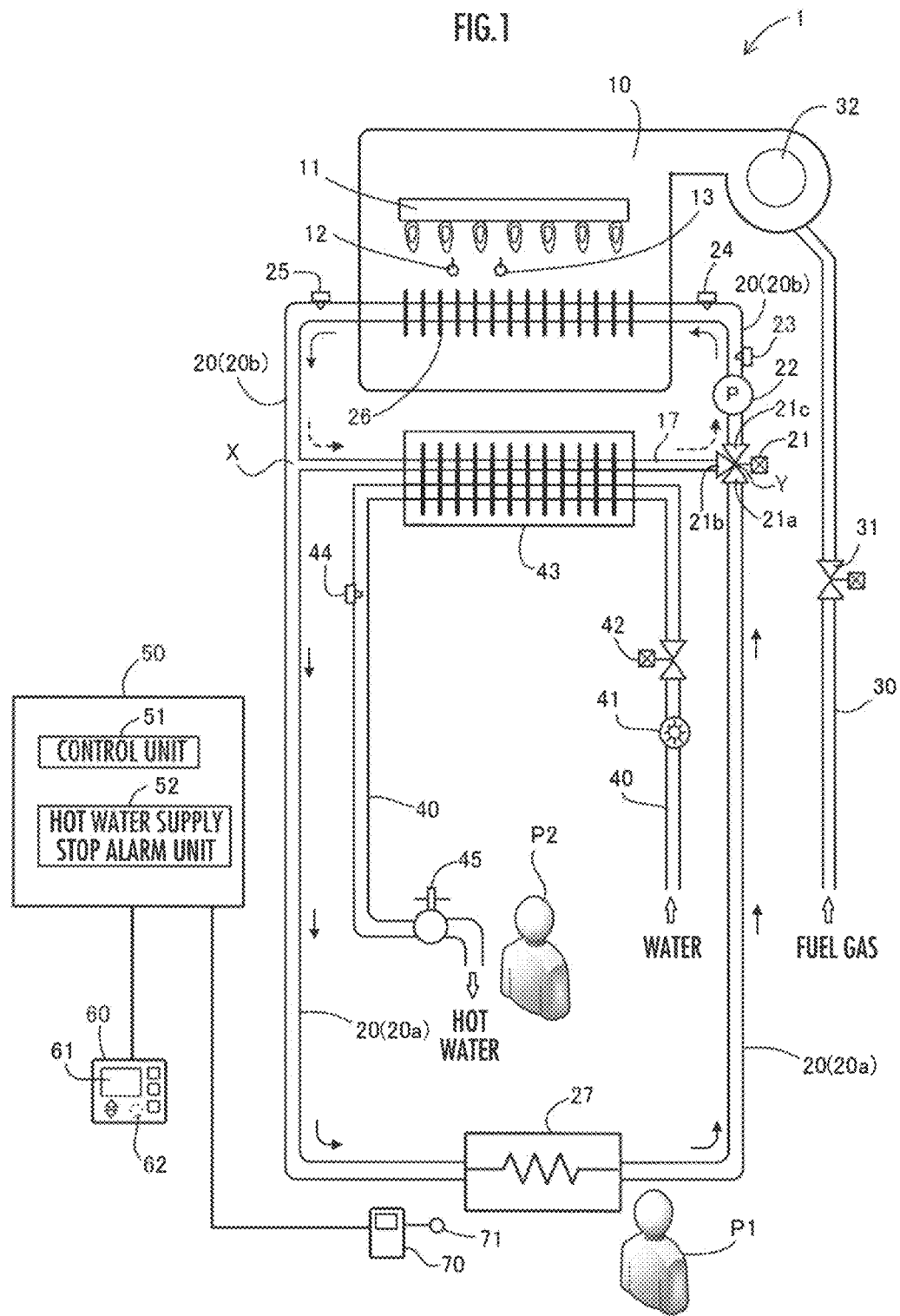
FIG. 1 is a configuration diagram of a heat source device.

An embodiment of the present invention will be described with reference to FIG. 1 to FIG. 3.

1. Configuration of the Heat Source Device

Referring to FIG. 1, a heat source device 1 according to the present embodiment includes: a heat medium circulation passage 20 (20a and 20b) having a heating terminal 27 (a floor heater or the like) connected on a way (to a middle) thereof, a heat medium heat exchanger 26 which is connected on a way of the heat medium circulation passage 20 and which is disposed in a combustion chamber 10, a burner 11 which heats the heat medium heat exchanger 26, an ignition electrode 12 for igniting the burner 11, a flame rod 13 which detects a combustion flame of the burner 11, a combustion fan 32 which mixes a fuel gas supplied from a gas supply passage 30 with combustion air and supplies the air-fuel mixture to the burner 11, a gas variable valve 31 which changes the opening degree of the gas supply passage 30 to change the supply flow rate of the fuel gas, a circulation pump 22 which circulates a heat medium (water, antifreeze or the like) into the heat medium circulation passage 20, an inflow water temperature sensor 24 which detects the temperature of a heat medium flowing into the heat medium heat exchanger 26, a pressure sensor 23 which detects the pressure in the vicinity of the inlet of the heat medium heat exchanger 26, an outflow water temperature sensor 25 which detects the temperature of the heat medium flowing out of the heat medium heat exchanger 26, a hot water supply bypass passage 17 which is in communication with the heat medium circulation passage 20, bypassing the heat medium heat exchanger 26, a hot water supply passage 40 having the upstream end thereof connected to waterworks (not illustrated) and the downstream end thereof connected to a hot water supply tap 45, a flow rate sensor 41 which detects the flow rate of water flowing into the hot water supply passage 40, a flow rate variable valve 42 (corresponding to the flow rate changing unit in the present invention) which changes the opening degree of the hot water supply passage 40 to change the flow rate of the water flowing into the hot water supply passage 40, a hot water supply heat exchanger 43 which is provided on a way of the hot water supply bypass passage 17 and the hot water supply passage 40 to perform heat exchange between the heat medium flowing through the hot water supply bypass passage 17 and the water flowing through the hot water supply passage 40 thereby to heat the water flowing through the hot water supply passage 40, and an outflow hot water temperature sensor 44 which detects the temperature of the hot water flowing out from the hot water supply heat exchanger 43 to the hot water supply passage 40. The heat medium heat exchanger 26 and the burner 11 together correspond to the heat medium heating unit in the present invention.

Provided at a location Y where the heat medium circulation passage 20 and the hot water supply bypass passage 17 are connected is a switching valve 21 which changes the ratio (distribution ratio) between the flow rate of the heat medium flowing from the circulation pump 22 to the heat medium heat exchanger 26 via the hot water supply bypass passage 17 (i.e. the flow rate of the heat medium flowing from a port 21b to a port 21c) and the flow rate of the heat medium flowing from the circulation pump 22 to the heat medium heat exchanger 26 via the heat medium circulation passage 20a between the heating terminal 27 and the hot water supply bypass passage 17 (i.e. the flow rate of the heat medium flowing from a port 21a to the port 21c). The switching valve 21 corresponds to the circulation mode switching unit in the present invention.

The heat source device 1 further includes a controller 50 which controls the entire operation of the heat source device 1. The controller 50 is an electronic circuit unit composed of a CPU, memories, various types of interface circuits and the like, which are not illustrated. The controller 50 executes a control program for the heat source device 1, which is stored in a memory, by the CPU thereby to function as a control unit 51 and a hot water supply stop alarm unit 52.

The controller 50 receives the detection signals from the flame rod 13, the inflow water temperature sensor 24, the outflow water temperature sensor 25, the flow rate sensor 41, and the outflow hot water temperature sensor 44. Further, the operations of the burner 11, the ignition electrode 12, the switching valve 21, the circulation pump 22, the gas variable valve 31, the combustion fan 32, and the flow rate variable valve 42 are controlled by the control signals output from the controller 50.

A heat source remote control 60 for remotely controlling the heat source device 1 is connected to the controller 50. Operation signals (signals for instructing, for example, the setting of operating conditions, such as the set temperature of hot water to be supplied, and the start of the heating operation) are input to the controller 50 in response to the operations performed by a user through the heat source remote control 60. Further, the screen of a display 61 of the heat source remote control 60 and the sound output from a speaker 62 thereof are controlled by the control signals output from the controller 50.

Further, the controller 50 is connected to a heating remote control 70 for remotely controlling the heating terminal 27 to receive signals indicative of, for example, the instruction for starting/stopping the heating, the set temperature for heating, and a room temperature detected by a room temperature sensor 71, which are transmitted from the heating remote control 70.

2. Heating Operation (Single Operation)

A description will now be given of the heating operation carried out by the control unit 51.

The control unit 51 starts the heating operation when the user performs the operation for starting the heating by the heat source remote control 60 or the heating remote control 70. In the heating operation, the control unit 51 sets the switching valve 21 to a first switching mode, in which the communication between the port 21b and the port 21c is cut off, whereas the port 21a and the port 21c are in communication, and then actuates the circulation pump 22.

Thus, the heat medium in the heat medium circulation passage 20 circulates through the circulation pump 22, the heat medium heat exchanger 26, a connected location X, the heating terminal 27, and the switching valve 21 (the connected location Y) in this order, and back to the circulation pump 22 (a first circulation mode). Then, in this state, the control unit 51 controls the operation of the burner 11 such that the detection temperature on the room temperature sensor 71 reaches a temperature close to a set heating temperature.

If the user performs the operation for stopping the heating by the heat source remote control 60 or the heating remote control 70, then the control unit 51 stops the operations of the burner 11 and the circulation pump 22 to terminate the heating operation. If the heat source remote control 60 or the heating remote control 70 has a timer operation setting function, then the control unit 51 starts and stops the heating operation according to the start and stop setting conditions for the timer operation.

3. Hot Water Supply Operation (Single Operation)

A description will now be given of the hot water supply operation performed by the control unit 51.

The control unit 51 monitors the detection flow rate of the flow rate sensor 41, and performs the hot water supply operation when the detection flow rate of the flow rate sensor 41 has reached a threshold flow rate or more (the threshold flow rate being set on the assumption that the hot water supply tap 45 is open).

In the hot water supply operation, the control unit 51 sets the switching valve 21 to a second switching mode, in which the communication between the port 21a and the port 21c is cut off, whereas the port 21b and the port 21c is in communication, and then actuates the circulation pump 22.

Thus, the heat medium in the heat medium circulation passage 20 (20a and 20b) circulates through the circulation pump 22, the heat medium heat exchanger 26, the connected location X, the hot water supply bypass passage 17, and the switching valve 21 (the connected location Y) in this order and back to the circulation pump 22 (a second circulation mode).

In this state, the control unit 51 actuates the burner 11 so as to heat the water flowing through the hot water supply passage 40 in the hot water supply heat exchanger 43 by the heat exchange with the heat medium flowing through the hot water supply bypass passage 17. Further, the control unit 51 controls the combustion amount of the burner 11 such that the detection temperature of the outflow hot water temperature sensor 44 reaches a desired hot water temperature set with the heat source remote control 60.

4. Parallel Operation of the Hot Water Supply Operation and the Heating Operation Referring now to the flowcharts of FIG. 2 and FIG. 3, a description will be given of the processing carried out by the control unit 51 and the hot water supply stop alarm unit 52 when a request for heating is received while the hot water supply operation is being performed.

In STEP1 of FIG. 2, the control unit 51 determines whether the hot water supply operation is being performed. If the hot water supply operation is being performed, then the control unit 51 proceeds to STEP2, or if the hot water supply operation is not being performed, then the control unit 51 branches off to STEP1.

In the next STEP2, the control unit 51 determines whether the request for heating (the instruction for performing the heating operation) has been made. If the request for heating has been issued, then the control unit 51 proceeds to STEP3, or if the request for heating has not been issued, then the control unit 51 branches off to STEP1.

In STEP3, the control unit 51 determines whether it is possible to perform the parallel operation of the hot water supply and the heating (the parallel heating and hot water supply operation) under the first parallel operation condition by distributing the heat medium to the hot water supply bypass passage 17 and the heating terminal 27 by the switching valve 21. If it is determined that the parallel heating and hot water supply operation can be performed under the first parallel operation condition, then the control unit 51 branches off to STEP30. If it is determined that the parallel heating and hot water supply operation cannot be performed under the first parallel operation condition, then the control unit 51 proceeds to STEP4.

The first parallel operation condition is that, for example, the heat medium can be supplied to the heating terminal 27 to perform the heating operation even when the heat medium required for heating the water of the flow rate determined by the opening degree of the hot water supply tap 45 to a desired hot water temperature is circulated to the hot water supply heat exchanger 43.

In STEP30, the control unit 51 sets the switching valve 21 to a third switching mode, in which the port 21a and the port 21c are in communication and the port 21b and the port 21c are also in communication, and actuates the circulation pump 22. Then, in this state, the circulation pump 22 and the burner 11 are actuated with their capacities increased, thereby starting the parallel heating and hot water supply operation.

In the next STEP31, the control unit 51 determines whether the request for the parallel operation (the state in which the request for heating and the request for hot water supply overlap) has been cleared. If the request for the parallel operation has been cleared (in this case, the single operation of the heating operation or the hot water supply operation is being performed, or neither the heating operation nor the hot water supply operation is being performed), then the control unit 51 branches off to STEP1. If the request for the parallel operation has not yet been cleared, then the control unit 51 proceeds to STEP32.

In STEP32, the control unit 51 determines whether the distribution of the heat medium to the destinations by the switching valve 21 will enable the parallel heating and hot water supply operation under a second parallel operation condition. The second parallel operation condition is that, for example, the hot water temperature can be maintained at a set hot water temperature and the room temperature can be also maintained at a set heating temperature. If it is determined that the parallel heating and hot water supply operation can be performed under the second parallel operation condition, then the control unit 51 proceeds to STEP31 (in this case, the parallel heating and hot water supply operation is continued). If it is determined that the parallel heating and hot water supply operation cannot be performed under the second parallel operation condition, then the control unit 51 branches off to STEP4.

The procedure from STEP4 to STEP10 and STEP40 of FIG. 3 indicates the processing carried out by the hot water supply stop alarm unit 52. The hot water supply stop alarm unit 52 starts a timer in STEP4 and determines in STEP5 whether the request for the parallel operation has been cleared. The hot water supply stop alarm unit 52 branches off to STEP1 if the request for the parallel operation has been cleared, or proceeds to STEP6 if the request for the parallel operation has not yet been cleared.

In STEP6, the hot water supply stop alarm unit 52 determines whether a clocking time T on the timer has reached 30 minutes (corresponding to the first predetermined time in the present invention) or more. If the clocking time T on the timer has reached 30 minutes or more, then the hot water supply stop alarm unit 52 proceeds to STEP7 of FIG. 3, or if the clocking time T on the timer has not yet reached 30 minutes, then the hot water supply stop alarm unit 52 branches off to STEP5.

In STEP7 of FIG. 3, the hot water supply stop alarm unit 52 outputs a buzzer sound from the speaker 62 of the heat source remote control 60 to urge a user P2 of hot water to stop using the hot water, and restarts the timer. When the user P2 stops using the hot water or decreases the flow rate of use in response to the buzzer sound alarm, the switching from the hot water supply operation to the heating operation or the parallel heating and hot water supply operation is enabled.

This arrangement makes it possible to prevent the user P1, who has issued the instruction for starting the heating operation, from feeling cold due to a significantly delayed start of the heating operation even though the user P1 has performed the operation for starting the heating.

In the subsequent STEP8, the hot water supply stop alarm unit 52 determines whether the request for the parallel operation has been cleared. If the request for the parallel operation has been cleared, then the hot water supply stop alarm unit 52 branches off to STEP40 to stop outputting the buzzer sound and proceeds to STEP1 of FIG. 2. Meanwhile, if it is determined in STEP8 that the request for the parallel operation has not yet been cleared, then the hot water supply stop alarm unit 52 proceeds to STEP9 to determine whether the clocking time T on the timer has reached 10 minutes (corresponding to the second predetermined time in the present invention) or more.

Further, if the clocking time T on the timer has reached 10 minutes or more, then the hot water supply stop alarm unit 52 branches off to STEP10, or if the clocking time T on the timer has not yet reached 10 minutes, then the hot water supply stop alarm unit 52 proceeds to STEP8. In STEP10, the hot water supply stop alarm unit 52 decreases the outflow hot water temperature by 2° C. or decreases, by the flow rate variable valve 42, the flow rate of the hot water coming out of the hot water supply tap 45 by two liters per minute.

Decreasing the temperature of the hot water coming out of the hot water supply tap 45 or decreasing the flow rate of the hot water by the processing in STEP10 makes it possible to cause the user P2, who is using the hot water, to feel the change in the hot water temperature or in the flow rate of the hot water, thus urging the user P2 to stop using the hot water or to decrease the using flow rate of the hot water. The processing in STEP10 corresponds to the hot water supply stop alarm in the present invention.

In the subsequent STEP11, the hot water supply stop alarm unit 52 determines whether the distribution of the heat medium to the destinations by the switching valve 21 will enable the parallel operation of the heating operation and the hot water supply operation. If the parallel operation can be performed, then the hot water supply stop alarm unit 52 proceeds to STEP12 to stop the output of the buzzer sound from the speaker 62 of the heat source remote control 60 and then proceeds to STEP31 of FIG. 2.

Meanwhile, if the parallel operation cannot be performed, then the hot water supply stop alarm unit 52 branches off to STEP7 and carries out again the processing of STEP7 and after. This causes the outflow hot water temperature to decrease in steps and the outflow hot water flow rate to decrease in steps. If it becomes no longer possible to decrease the outflow hot water temperature by 2° C. or to decrease the outflow hot water flow rate by two liters per minute, then the control unit 51 stops the hot water supply operation.

5. Other Embodiments

In the embodiment described above, the switching valve 21 uses a valve that enables changing the ratio (the distribution ratio) between the inflow amount of the heat medium from the hot water supply bypass passage 17 to the heat medium circulation passage 20*b* (the inflow amount of the heat medium from the port 21*b* to the port 21*c*) and the inflow amount of the heat medium from the heat medium circulation passage 20*a* to the heat medium circulation passage 20*b* (the inflow amount of the heat medium from the port 21*a* to the port 21*c*). Thus, it has been determined in STEP3 and STEP32 of FIG. 2 and STEP11 of FIG. 3 whether the parallel operation of the hot water supply operation and the heating operation can be performed by changing the distribution ratio of the heat medium.

However, the switching valve 21 may alternatively use a switching valve which enables switching only between a first circulation mode, in which the heat medium is allowed to flow from the heat medium circulation passage 20*a* to the heat medium circulation passage 20*b* (the inflow of the heat medium from the port 21*a* to the port 21*c*), whereas the heat medium is not allowed to flow from the hot water supply bypass passage 17 to the heat medium circulation passage 20*b* (the inflow of the heat medium from the port 21*b* to the port 21*c*), and a second circulation mode, in which the heat medium is allowed to flow from the hot water supply bypass passage 17 to the heat medium circulation passage 20*b* (the inflow of the heat medium from the port 21*b* to the port 21*c*), whereas the heat medium is not allowed to flow from the heat medium circulation passage 20*a* to the heat medium circulation passage 20*b* (the inflow of the heat medium from the port 21*a* to the port 21*c*), and the switching valve mentioned above is incapable of changing the distribution ratio.

In this case, the processing in STEP3 and STEP30 to STEP32 of FIG. 2 and in STEP11 to STEP12 of FIG. 3 will be omitted.

In the embodiment described above, the hot water supply stop alarm according to the present invention has been given in the form of the output of the buzzer sound, the decrease in the set hot water temperature, and the decrease in the outflow hot water flow rate; alternatively, however, only one of these may be performed or a plurality of these may be combined and simultaneously performed. Further alternatively, the hot water supply stop alarm may be given in the form of the buzzer sound first, and if the hot water supply stop alarm by the buzzer sound fails to stop the use of hot water, then the hot water supply stop alarm may be given in the form of the decrease in the set hot water temperature or in the outflow hot water flow rate.

Further, if the heat source remote control 60 or the heating remote control 70 has a sound output function, then a voice message urging the user to stop using hot water (e.g. "The operation to start heating has been performed. Please stop using the hot water now.") may be output.

Further, in the embodiment described above, the hot water supply stop alarm unit 52 branches off to STEP40 to stop the output of the buzzer sound when it is determined in STEP8 of FIG. 3 that the request for the parallel operation has been cleared. Alternatively, however, the output of the buzzer sound may be stopped by a clearing operation performed by the user (e.g. by operating a particular switch on the heat source remote control 60).

In the embodiment described above, the heat medium heating unit according to the present invention is composed of the heat medium heat exchanger 26 and the burner 11 using a fuel gas; however, the heat medium heating unit according to the present invention is not limited to this configuration. The heat medium heating unit may be configured using an oil burner, an electric heater, or the like.

In the embodiment described above, the first parallel operation condition and the second parallel operation condition have been set to be different; however, these two conditions may alternatively be set to be the same. Further, a first parallel operation condition and a second parallel operation condition which are different from those in the foregoing embodiment may be set.

DESCRIPTION OF REFERENCE NUMERALS

1 . . . Heat source device; 11 . . . Burner; 17 . . . Hot water supply bypass passage; 20 . . . Heat medium circulation passage; 21 . . . Switching valve; 26 . . . Heat medium heat exchanger; 27 . . . Heating terminal; 40 . . . Hot water supply passage; 42 . . . Flow rate variable valve; 43 . . . Hot water supply heat exchanger; 50 . . . Controller; 51 . . . Control unit; 52 . . . Hot water supply stop alarm unit; 60 . . . Heat source remote control; and 70 . . . Heating remote control.

What is claimed is:
1. A heat source device comprising:
a heat medium circulation passage which has a heating terminal connected thereto and through which a heat medium circulates;
a heat medium heating unit which is provided along the heat medium circulation passage and which heats a heat medium that circulates in the heat medium circulation passage;
a hot water supply bypass passage which bypasses the heat medium heating unit and which is in communication with the heat medium circulation passage;

a hot water supply passage which has an upstream end and a downstream end, the upstream end being connected to waterworks and the downstream end being connected to a hot water supply tap;

a hot water supply heat exchanger which is connected between the hot water supply bypass passage and the hot water supply passage and which heats water flowing through the hot water supply passage by heat exchange between the heat medium flowing through the hot water supply bypass passage and water flowing through the hot water supply passage;

a circulation mode switching unit which switches between a first circulation mode and a second circulation mode, the first circulation mode being a mode in which the circulation of the heat medium in the heat medium circulation passage that has passed through the hot water supply bypass passage and the heat medium heating unit is disabled, whereas the circulation of the heat medium in the heat medium circulation passage that has passed through the heat medium heating unit and the heating terminal is enabled, and the second circulation mode being a mode in which the circulation of the heat medium in the heat medium circulation passage that has passed through the heating terminal and the heat medium heating unit is disabled, whereas the circulation of the heat medium in the heat medium circulation passage that has passed through the hot water supply bypass passage and the heat medium heating unit is enabled;

a control unit which sets the first circulation mode by the circulation mode switching unit and performs a heating operation, in which the heat medium heating unit is actuated, in response to a predetermined request for heating, and which sets the second circulation mode by the circulation mode switching unit and performs a hot water supply operation, in which the heat medium heating unit is actuated, in response to a predetermined request for hot water supply; and a hot water supply stop alarm unit which performs a hot water supply stop alarm to urge a user of hot water to stop using the hot water in a case where the request for heating is continued for a first predetermined time or more while the hot water supply operation is being performed.

2. The heat source device according to claim 1, comprising:
a flow rate changing unit that changes a flow rate of water that flows through the hot water supply passage,
wherein the hot water supply stop alarm unit performs, as the hot water supply stop alarm, processing for decreasing a flow rate of water flowing through the hot water supply passage by the flow rate changing unit.

3. A heat source device comprising:
a heat medium circulation passage which has a heating terminal connected thereto and through which a heat medium circulates;
a heat medium heating unit which is provided along the heat medium circulation passage and which heats the heat medium that circulates in the heat medium circulation passage;

a hot water supply bypass passage which bypasses the heat medium heating unit and which is in communication with the heat medium circulation passage;

a hot water supply passage which has an upstream end and a downstream end, the upstream end being connected to waterworks and the downstream end being connected to a hot water supply tap;

a hot water supply heat exchanger which is connected between the hot water supply bypass passage and the hot water supply passage and which heats water flowing through the hot water supply passage by heat exchange between the heat medium flowing through the hot water supply bypass passage and water flowing through the hot water supply passage;

a circulation mode switching unit which changes a distribution ratio between a circulation flow rate of the heat medium in the heat medium circulation passage that has passed through the hot water supply bypass passage and the heat medium heating unit and a circulation flow rate of the heat medium in the heat medium circulation passage that has passed through the heating terminal and the heat medium heating unit;

a control unit which performs a parallel heating and hot water supply operation, in which the heat medium heating unit is actuated in a mode in which the heat medium is flown through both the hot water supply bypass passage and the heating terminal from the heat medium heating unit, the mode being set by the circulation mode switching unit, in a case where a predetermined request for heating and a predetermined request for hot water supply are both made and a first parallel operation condition is satisfied; and a hot water supply stop alarm unit which performs a hot water supply stop alarm to urge a user of hot water to stop using the hot water in a case where a second parallel operation condition is no longer satisfied and a state in which the second parallel operation condition is not satisfied continues for a second predetermined time while the parallel heating and hot water supply operation is being performed.

4. The heat source device according to claim 3,
wherein the control unit controls heating power of the heat medium heating unit such that hot water of a desired hot water temperature will be supplied from the hot water supply passage in the parallel heating and hot water supply operation, and
the hot water supply stop alarm unit performs, as the hot water supply stop alarm, processing for decreasing the desired hot water temperature.

5. The heat source device according to claim 3, comprising:
a flow rate changing unit that changes a flow rate of water that flows through the hot water supply passage,
wherein the hot water supply stop alarm unit performs, as the hot water supply stop alarm, processing for decreasing a flow rate of water flowing through the hot water supply passage by the flow rate changing unit.

* * * * *